Jan. 19, 1960  J. M. CRAFTON  2,921,336
MOLDING ASSEMBLIES
Filed Aug. 30, 1956  3 Sheets-Sheet 2
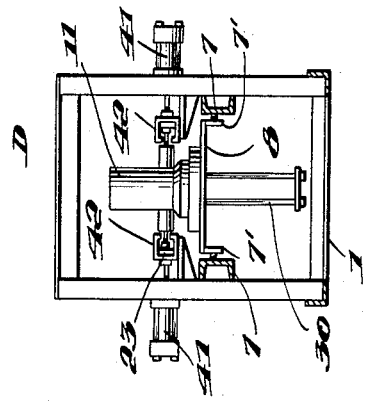
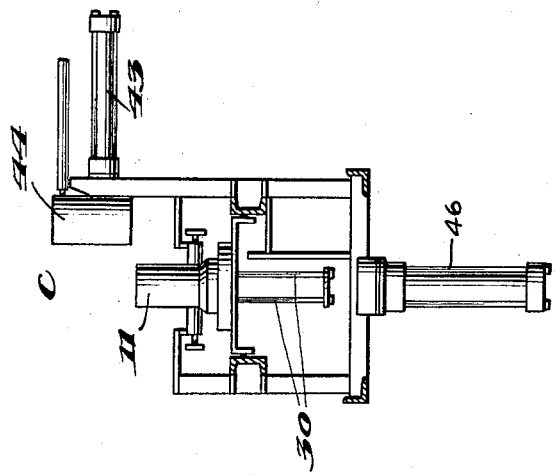
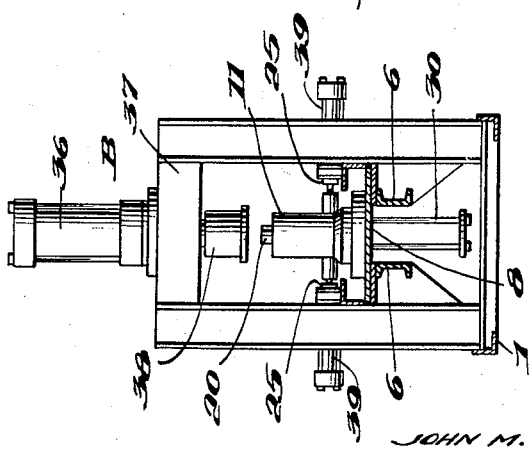
INVENTOR
JOHN M. CRAFTON,
BY
ATTORNEYS Jan. 19, 1960  J. M. CRAFTON  2,921,336
MOLDING ASSEMBLIES
Filed Aug. 30, 1956  3 Sheets-Sheet 3
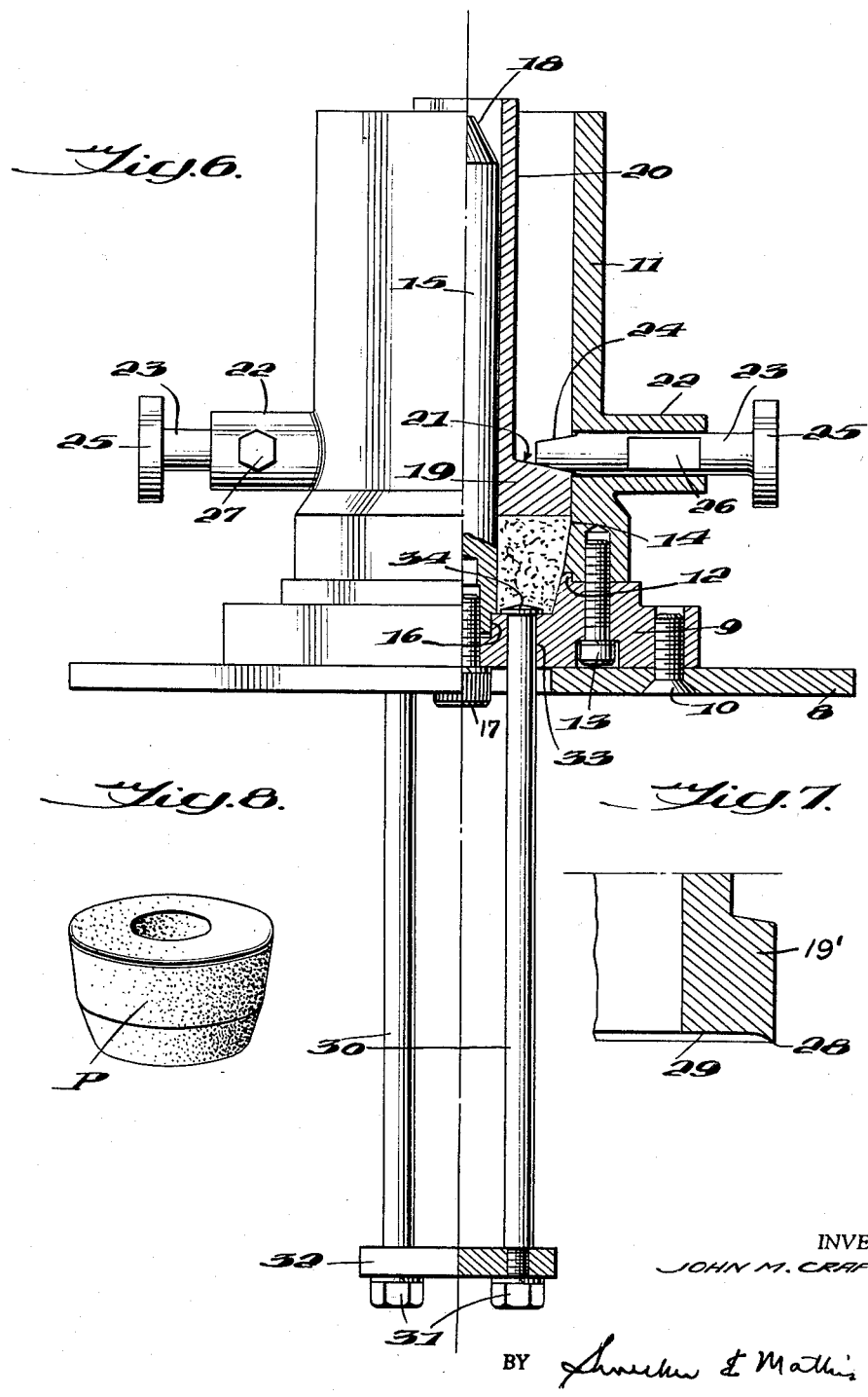
INVENTOR
JOHN M. CRAFTON,
BY
ATTORNEYS

# United States Patent Office 2,921,336
Patented Jan. 19, 1960

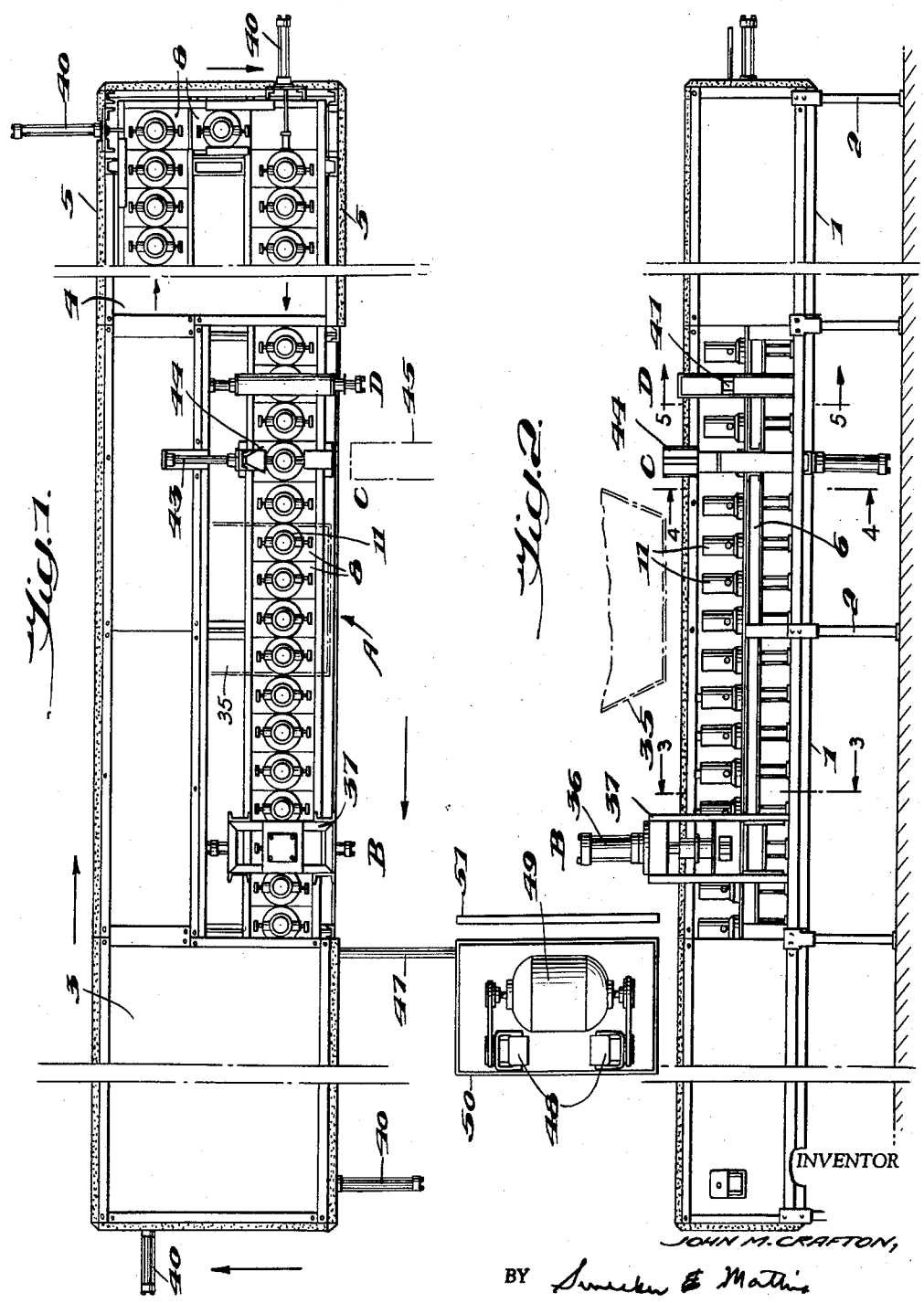

2,921,336

MOLDING ASSEMBLIES

John M. Crafton, Morristown, Tenn.

Application August 30, 1956, Serial No. 607,068

6 Claims. (Cl. 18—4)

This invention relates to improvements in molding assemblies, particularly for molding ready-to-use products from waste wood scrap, such as finely ground chips, sawdust and the like.

Heretofore, woodworking plants have been accustomed to burn the waste scrap material resulting from sawing and finishing operations, particularly chips and sawdust. This not only is a waste of material, but is also requires a burning unit, an operator's time, and frequently some means of inducing the burning, such as oil or other fuel.

It has been found that many ready-to-use products can be made from such scrap material or wood waste, such, for example, as plugs for paper rolls, shoe heels, furniture legs, belting cores, saddle seats, cups, saucers, coasters, balls or spheres, ornaments of various shapes, etc.

One object of this invention is to provide a molding assembly which will utilize the waste wood scrap in making molded products of the character mentioned and others that are adapted for many practical uses.

Another object of the invention is to improve the construction of molding assemblies to provide for the molding therein effectively of waste wood scrap and the production of ready-to-use products therefrom.

Still another object of the invention is to provide, in a molding assembly, for the progressive feeding of waste wood scrap into individual molds and the processing of such scrap material through the steps of the assembly to provide ready-to-use products that have substantial rigidity and strength, comparable in many respects to solid wood products.

A still further object of the invention is to improve the molding unit in which waste wood scrap may be compressed, shaped and treated to form complete and finished ready-to-use products therein.

These objects may be accomplished, according to one embodiment of the invention, by providing a succession of molding units adapted for step-by-step or continuous movement through the cycle of the assembly. At one station, the waste wood scrap material may be introduced successively into the molding units and, as the latter move progressively through the cycle of operation, this material, in the respective units, is compressed and subjected to the successive treating actions which will form complete, finished, ready-to-use products therefrom. It is preferred that the waste wood scrap be mixed with a suitable adhesive, such as a resin, which will solidify under heat and pressure. A resin of the character of urea formaldehyde, preferably thermosetting, may be used for this purpose. With such a material, the molding units are successively subjected to pressure and heat and move through the ovens to a discharge position in a complete cycle of operations which provides for the discharge of the finished products at the end of the cycle. One embodiment of the invention provides for an elapsed time of some ten minutes for the complete cycle, although this will vary according to the size and extent of automatic action obtained in the machine.

This embodiment of the invention is illustrated in the accompanying drawings, in which:

Fig. 1 is a top plan view of the improved molding assembly;

Fig. 2 is a side elevation thereof;

Fig. 3 is a vertical cross section therethrough, on the line 3—3 in Fig. 2;

Fig. 4 is a similar view on the line 4—4 in Fig. 2;

Fig. 5 is a similar view on the line 5—5 in Fig. 2;

Fig. 6 is a vertical section, partly in elevation, of the molding unit;

Fig. 7 is a detail cross section through the molding plunger on an enlarged scale; and Fig. 8 is a perspective view of one of the molded products that may be formed thereby.

In the form of molding assembly illustrated as one embodiment of the invention, this comprises an elongated structure having a central operating section with elongated ovens on opposite sides thereof for treating the material that is being molded. In this form, the elongated frame is designated generally by the numeral 1 and is supported by legs 2 at intervals along the length thereof, as indicated in Fig. 2. The frame 1 is suitably braced so as to form a substantially rigid structure and has a length sufficient to provide the desired cycle of operation for the effective molding of the material being treated.

Intermediate the length of the elongated frame 1 is a filling station, generally designed at A. While the machine may be operated entirely automatically, including the filling of the molds, the latter steps can be performed manually, if desired, by the location of an operator at the filling station A.

A press station is indicated at B, where hydraulic pressure is applied to the material in the molds successively, and such pressure is retained thereby as the molds progress through the subsequent treating operations. In this embodiment of the invention, I have provided for ovens, shown at 3 and 4 at the respective opposite ends of the elongated frame 1 through which the molds progress in the cycle of movement that will be apparent from Fig. 1 and as indicated by the arrows therein. The The ovens 3 and 4 have suitable means therein for heating the material effectively, such as steam, gas, or electric heating means, any suitable form of which may be employed and is not illustrated in detail. The ovens preferably are insulated or covered with sheet insulation, as indicated at 5 in Fig. 1, to confine the heat therein.

The molded products, after moving through the cycle of operations, including the treatment in the ovens 3 and 4, are finally ejected at a station, generally indicated at C. Various steps are involved in the release of the pressure, the opening of the mold and the discharge of the molded product, all of which may be accomplished automatically, if desired, and as provided in this embodiment of the invention, which will be described more in detail.

Extending lengthwise of the frame 1 in the region of the stations A, B and C is an elevated support frame 6 comprising a pair of side rails suitably mounted on the frame 1 and spaced apart, adapted to receive and support the molding units as they progress through this portion of the machine. These rails 6 are shown in Figs. 2 and 3. The rails 6 form a trackway for supporting the molding units in the region of the stations A, B and C. Extending lengthwise therefrom, in horizontal alignment with the support rails 6, are tracks 7 extending through the ovens 3 and 4, including the section behind the operator's section that forms a connecting extension between the ovens. The tracks 7 have mounting rollers 7' journaled thereon, forming a roller conveyor for the molding units.

The structure of each molding unit is shown in detail in Fig. 6. A support plate 8 has a mold base 9 mounted thereon, as for example, by set screws 10. A mold body is shown at 11 mounted upon the base 9, where it may be centered by a shoulder 12 and secured in place thereto by set screws 13. The top of the mold body 11 is open, adapted to receive the moldable material therein, and a mold cavity is formed in the lower portion of the body 11, as indicated generally at 14. The top portion of the base 9 may be depressed or recessed to form a portion of the cavity 14, as illustrated in Fig. 6, although the cavity may be entirely in the body 11, if desired.

A center pin is shown at 15, extending upright in the mold body 11, and may be used whenever a molded product is to be formed with a center opening therein, as, for example, in making plugs for paper rolls, an example of which is shown at P in Fig. 8. When molded products, other than perforated objects, are to be formed, the center pin 15 can be omitted entirely, and in that event, the opening in the mold base 9 can be closed in suitable manner.

The pin 15 is shown with a reduced lower end inserted into a recess 16 in the base 9. A set screw 17 extends through the base 9 and has threaded connection with the lower end of the pin 15 for holding the latter in place. The upper end of the pin 15 is tapered, as shown at 18, in a conical or frusto-conical form to divert the wood material into the cavity 14 in the mold body 11 and to distribute such material uniformly therearound.

After a charge of material is introduced into the mold cavity 14 in the body 11, this material is confined and pressed by a plunger 19 which extends across the open interior of the mold body 11. In the form illustrated, in which the center pin 15 is used, the plunger 19 extends between the periphery of the center pin and the interior wall of the mold body, with a sliding fit therebetween, to confine the material in the cavity 14 upon the application of pressure to the upper end of the plunger. The plunger 19 is formed with an enlarged head and with a reduced cylinder or sleeve 20 extending upwardly from the head of the plunger around the pin 15 to a point adapted to project from the upper open end of the mold body 11 when the desired quantity of material has been compressed in the cavity 14, so as to insure of the application of sufficient pressure thereto.

The upper face of the head of the plunger 19 is bevelled in frusto-conical form, as indicated at 21. It has been found that the taper of this bevelled face 21 should be approximately 10° to the horizontal for best results in locking the plunger in place. The width of the bevelled face should be sufficient to obtain a secure overlap of the means provided for latching the plunger in the mold cavity.

According to this embodiment of the invention, sleeves are provided at 22 on opposite sides of the mold body 11, with openings therethrough to the interior of the mold body. Latch pins 23 are mounted in the sleeves 22 and slidable axially thereof. Each of the latch pins 23 has a wedge-shaped inner end portion 24 flattened on opposite sides, so that one of the flattened faces thereof can be engaged over the bevelled face 21 on the plunger 19 at each opposite side of the mold, and thereby latch the mold in its compressed position. It has been found that the provision of a wedge-shaped end on the latch pin, flattened on two sides only, gives greater strength in holding the plunger in place than would a conical end which could be provided otherwise, if desired.

Each latch pin extends outwardly through its sleeve 22 beyond the outer end thereof and is provided with a head 25 on said outer end. The shank of the pin is also flattened at 26 intermediate the length thereof, in position to be engaged by a set screw 27 that has slidable bearing contact with the face 26, to prevent turning of the latch pin, and thereby insures of proper holding relation of the wedge-shaped inner end portion thereof with the bevelled face 21 of the plunger 19.

If desired, and when forming products of the character of the plugs P (Fig. 8), to provide a rounded edge thereon, the lower peripheral edge of the plunger may be feathered, as indicated at 28 in Fig. 7. This provides a recessed face 29 on the plunger 19, which has a concave outer edge portion on the recess, closing the upper side of the cavity 14. This will result in forming a top face on the molded product, such as the plug P, which will have a rounded outer edge. Any other desired shape may be provided thereon by varying the face 29 or edge portion 28 of the plunger.

The molding unit is provided also with means for ejecting the molded product from the cavity 14. In this embodiment of the invention, the ejecting means comprises ejector rods 30 extending downwardly through the mold base 9, having abutments 31 on the lower end thereof, in the form of lock nuts, as illustrated. A plate 32 connects together the lower ends of the rods 30 to hold these properly spaced apart. The rods 30 extend slidably through holes 33 formed in the mold base 9 on opposite sides of the center axis thereof for vertical reciprocating movement relative thereto. While the rods 30 may extend just to the bottom face of the cavity 14, in this embodiment of the invention, it is preferred that heads 34 be formed on the upper ends of the rods 30 within the mold cavity, not only to limit the downward sliding movement of the rods, but also to form indentations on the lower face of the molded product, for ornamental or utilitarian effect.

The series of molding units, of the character shown in Fig. 6, is moved in succession through the machine. These molding units may be interconnected, if desired, and moved in endless chain fashion, but it is preferred, for simplicity of operation, that the units be moved along the rails 6 and the tracks 7 step-by-step by sliding motions.

The plates 8 of the molding units ride upon the rails 6 in the region of the stations A, B and C, as shown in Figs. 2 and 5. Then, throughout the cycle of movement through the ovens, the plates 8 ride upon the rollers 7' of the tracks 7 that are provided along the length of the cycle of movement through the ovens.

Provision should be made at the station A for filling the mold units. While this filling operation may be performed automatically, in this embodiment of the invention, the filling action is accomplished manually from a hopper 35 provided over the top of the machine. The operator can scoop out or remove from the hopper 35 the desired quantity of material and drop this into the top of each mold body 11, with the plunger 19 removed therefrom. If the center pin 15 is used in the mold, the tapered upper end 18 of the pin will divert the material and distribute it uniformly around the cavity of the mold. Then, the operator inserts the plunger 19 into the mold body over the material. A step-by-step movement is preferred and this operation can be completed during the dwell in the cycle of movement. A few seconds will be sufficient for the filling and covering of the material in the mold, after which the series of molds can be advanced to the next position where another of these molds can be filled in like manner.

When each mold reaches the position B, provision is made for applying pressure to the plunger 19 to compress the material to the desired extent. This is accomplished by a hydraulic cylinder 36 mounted on a frame 37 extending upward and over the series of molds travelling along the rails 6. The piston of the hydraulic cylinder 36 acts upon the sleeve 20 or piston portion of the plunger 19 that projects above the upper end of the mold body 11, forcing the plunger 19 downward until the material is compressed to the desired extent. This piston portion is indicated at 38 in Fig. 3.

With the plunger 19 held in its lowered compressing position by the action of the hydraulic cylinder 36, the latch pins 23 can then be forced inward to cause engagement by the wedge-shaped inner ends 24 thereof with the bevelled upper face 21 on the plunger 19. Power cylinders are shown at 39 on opposite sides of the path of movement of the molding units at the station B, and mounted on the frame 37, for accomplishing the application of the latch pins 23. The plunger portions of the cylinders 39 are forced against the heads 25 on the pins 23, thereby moving the pins inward to the position shown in Fig. 6. Then, the pressure on the cylinder 36 is released and the plunger 19 is held in its compressed position by the pins 23 during the continued movement of the molding unit through the cycle of operation.

As the respective molding units pass away from the press station B, the supporting plates 8 are carried from the rails 6 onto the rollers 7' of the tracks 7 and continue on the rollers throughout the heating units or ovens until they reach the ejector station C, as hereinafter described. This step-by-step movement may be accomplished, according to this embodiment of the invention, by indexing cylinders, indicated generally at 40, and located adjacent the corners of the rectangular path of movement of the molding units through the ovens. These indexing cylinders are properly timed so as to advance one step successively, moving the successive molding units lengthwise and transversely of this rectangular path of movement, as will be apparent from the diagrammatic illustration shown in Fig. 1. For example, the cylinder 40 in the lower right hand corner in Fig. 1 has just advanced the lower row of molding units one step toward the left and its plunger is then withdrawn, clearing the space for the action of the plunger of the indexing cylinder 40 at the upper right hand corner of this path, which will then advance the two molding units downward one step. This action will clear the space at the upper right hand corner of the ovens and allow the indexing cylinder at the upper left hand corner of Fig. 1 to advance the horizontal row of molding units one step toward the right. Then, in turn, the indexing cylinder 40 at the lower left hand corner of Fig. 1 will advance the two molding units one step upwardly on the drawing and again allow room for the advancement of the lower row of cylinders one step toward the left by the cylinder 40 of the lower right hand corner of the drawing, thereby completing the cycle of operation, which continues step-by-step as the molding progresses.

Throughout the major portion of the travels of the units through the ovens 3 and 4, the adhesive is caused to set and thereby mold and bond the wood particles together in a secure effective fashion, to form a complete solid molded product. The length of time will depend upon the character of the adhesive and the character of the wood particles used, but a conventional operation has this cycle timed for ten minutes, which is mentioned merely as an example.

As soon as the respective molding units are discharged from the oven 4 toward the loading position A, they reach the position just in advance of the ejector station C. At this point, indicated at D in Fig. 1, the latch pins 23 are withdrawn. Cylinders 41 are used for this purpose, as shown in Fig. 5. Each of the cylinders 41 has, on the plunger thereof, a yoke 42 normally lying in the path of the head 25 of an adjacent latch pin 23. As the molding unit reaches the position of the station D, the heads 25 enter the yokes 42. Then, upon operation of the power cylinders 41 in opposite directions, the pins 23 are forcibly withdrawn from engagement with the bevelled upper face 21 on the plunger 19, thereby releasing the plunger and permitting it to be withdrawn subsequently when the unit reaches the ejector station C.

At the latter point, a push-off cylinder 43 is mounted transversely over the top of the line of molding units.

The plunger portion of the cylinder 43 is provided with a U-shaped pusher member 44 in position to engage the molded article as ejected from the mold body 11 and to force it laterally to discharge from the machine. A trough is indicated at 45, adapted to reecive the molded articles thus discharged and to direct these to a desired point, such as a suitable receptacle.

The ejector action is accomplished by a cylinder 46 (Fig. 4) which is mounted beneath the frame 1 in position to engage the lower ends of the ejector rods 30. Upon operation of the cylinder 46, the plunger member thereof is moved upward and acts on the rods 30 to force the molded product P out of the cavity 14 of the mold and through the open upper end of the body 11 into the path of the pusher 44. As this occurs, the cylinder 43 is operated to eject the article, as described above.

The operator catches the plunger 19—20 as the article is ejected from the mold body 11 and holds it until the quantity of material is introduced into the cavity, as described above, after which this plunger can be re-applied. The sequence of steps will then continue.

In this embodiment of the invention, it is preferred to use hydraulic power for the several cylinders referred to, because of the increased power and pressure obtained thereby, although it is recognized that other suitable power devices may be substituted therefor. Where hydraulic pressure is used, a source of fluid under pressure may be connected with the machine, as through the pipe system generally indicated at 47 in Fig. 1, from hydraulic pumps 48 operated by a motor 49. An oil reservoir is shown at 50 for supplying fluid to the pumps and to which the return lines from the cylinders can be connected.

It is preferred that the entire operation be timed automatically for step-by-step action. This may be accomplished by suitable limit switches, or in other suitable manner, but the several controls provided for the entire operation of the machine may be mounted on a control panel, generally indicated at 51 in Fig. 1. They are not illustrated in detail because they will be well understood in the art.

The molding system may utilize any suitable or desired material, preferably waste wood scrap, such as finely ground thread-like chips, sawdust and other such moldable material. A suitable adhesive, such as urea formaldehyde resin, may be combined therewith, in a quantity that will adhesively secure all of the particles together in molded form, compact relation and solid body. One example utilizes 7½% resin to 92½% of chips by weight. The material preferably is uniformly mixed before being supplied to the hopper 35 for use by the operator.

Many different moldable products can be formed by the molding assembly. One example is illustrated in Fig. 8 and comprises a plug for paper rolls which replaces the conventional wooden plugs used heretofore. Other products that may be formed include furniture legs, coasters, balls or spheres, ornaments of various kinds, shoe heels, etc. These may be formed either solid or with an opening through the center thereof, as desired. The center pin 15 provides for the formation of the center opening, but may be omitted if no center opening is required.

While the invention has been illustrated and described in one embodiment, it is recognized that variations and changes may be made therein without departing from the invention as set forth in the claims.

I claim:

1. In a molding assembly, the combination of a circuitous track, a series of molds, means for advancing the series of molds around said circuitous track from a loading position at one point in the track to an ejecting position adjacent thereto, each of the molds having a complete mold cavity therein and a removable plunger adapted to close the cavity after filling at said loading position, means on one side of the loading position for compressing moldable material in the cavity by the plunger and for locking the plunger in compressed position, and means on the opposite side of said loading position for unlocking the plunger and ejecting the molded articles from the molds.

2. In a molding assembly, the combination of a circuitous track, a series of molds, means for advancing the series of molds around said circuitous track from a loading position at one point in the track to an ejecting position adjacent thereto, each of the molds having a complete mold cavity therein and a removable plunger adapted to close the cavity after filling at said loading position, each of the molds having latching means for the plunger, means on one side of the loading position for applying pressure to the plunger and for securing the latching means to hold the plunger in compressed position, and means on the opposite side of the loading position for releasing the latching means to permit discharge of the molded article.

3. In a molding assembly, the combination of a circuitous track, a series of molds, means for advancing the series of molds around said circuitous track from a loading position at one point in the track to an ejecting position adjacent thereto, each of the molds having a complete mold cavity therein and a removable plunger adapted to close the cavity after filling at said loading position, each of the molds having latching means for the plunger, means on one side of the loading position for applying pressure to the plunger and for securing the latching means to hold the plunger in compressed position, means on the opposite side of the loading position for releasing the latching means to permit discharge of the molded article, and separate means for ejecting from each mold the molded article and plunger.

4. In a molding assembly, the combination of a circuitous track, a series of molds, means for advancing the series of molds around said circuitous track from a loading position at one point in the track to an ejecting position adjacent thereto, each of the molds having a complete mold cavity therein and a removable plunger adapted to close the cavity after filling at said loading position, each of the molds having latching means for the plunger, means on one side of the loading position for applying pressure to the plunger and for securing the latching means to hold the plunger in compressed position, means on the opposite side of the loading position for releasing the latching means to permit discharge of the molded article, and ejecting means acting on the article in the mold to force said article and plunger out of the mold together.

5. In a molding assembly, the combination of a circuitous track, a series of molds, means for advancing the series of molds around said circuitous track from a loading position at one point in the track to an ejecting position adjacent thereto, each of the molds having a complete mold cavity therein and a removable plunger adapted to close the cavity after filling at said loading position, each of the molds having latching means for the plunger, means on one side of the loading position for applying pressure to the plunger and for securing the latching means to hold the plunger in compressed position, means on the opposite side of the loading position for releasing the latching means to permit discharge of the molded article, ejecting means acting on the article in the mold to force said article and plunger out of the mold together, and an oven having heating means for the molded articles with the track extending therethrough between said loading and discharge positions.

6. In a molding assembly, the combination of a polygonal track, a series of disconnected molds, each of the molds having a complete mold cavity therein, said molds extending substantially throughout the major portion of the length of the track with a space between a pair of said molds at least equal to the size of a mold, fluid operated pusher members adjacent each angle of the track for imparting step-by-step pushing action to a plurality of the molds for advancing said plurality of molds through said space whereby successive operation of said pusher members advances all the molds around the track from a loading station at one point in the track to an ejecting station adjacent thereto, a removable plunger for each mold adapted to close a mold cavity after filling at said loading position, latching means for the plunger, means on one side of the loading station for applying pressure to the plunger and for securing the latching means to hold the plunger in compressed position, means on one side of the ejecting station for releasing the latching means to permit discharge of the molded article, ejecting means at said ejecting station acting on the article in the mold to force said article and plunger out of the mold together, and an oven having means for applying heat to the molds with the track extending therethrough between said loading and discharge stations.

References Cited in the file of this patent

UNITED STATES PATENTS

| | | |
|---|---|---|
| 1,979,156 | Hettel | Oct. 30, 1934 |
| 2,336,982 | Cremer | Dec. 14, 1943 |
| 2,342,920 | Clark | Feb. 29, 1944 |
| 2,431,095 | Tucker | Nov. 18, 1947 |
| 2,485,452 | Lyijynen | Oct. 18, 1949 |
| 2,780,832 | Schmitt et al. | Feb. 12, 1957 |